United States Patent [19]

Chszaniecki

[11] 4,320,928
[45] Mar. 23, 1982

[54] DRIVE MEANS FOR A TWIN SCREW EXTRUDER

[75] Inventor: Siegfried Chszaniecki, Hanover, Fed. Rep. of Germany

[73] Assignee: Hermann Berstorff Maschinenbau GmbH, Hannover Kleefeld, Fed. Rep. of Germany

[21] Appl. No.: 185,550

[22] Filed: Sep. 9, 1980

[30] Foreign Application Priority Data

Sep. 27, 1979 [DE] Fed. Rep. of Germany ....... 2939094

[51] Int. Cl.³ .................. F16C 35/06; F04B 23/14
[52] U.S. Cl. .................. 308/207 R; 308/234
[58] Field of Search ............ 308/207 R, 35, 234; 366/297, 360, 83, 318

[56] References Cited

U.S. PATENT DOCUMENTS

| | | | |
|---|---|---|---|
| 1,926,403 | 9/1933 | Phillips | 308/207 R |
| 2,674,942 | 4/1954 | Rockstrom | 308/207 R |
| 3,516,352 | 6/1970 | Lewis | 308/207 R |
| 4,142,765 | 3/1979 | Oslaker | 308/207 R |

Primary Examiner—Willis Little
Attorney, Agent, or Firm—Schwartz, Jeffery, Schwaab, Mack, Blumenthal & Koch

[57] ABSTRACT

Drive means for a twin screw extruder has a pair of drive shafts mounted in a housing and each to be connected to a drive and to a respective one of the screws of the extruder. A thrust bearing to absorb the axial thrust applied to the screws comprises a thrust ring surrounding both drive shafts and supported in the housing by an axial roller bearing, a pair of coaxial butting rings inserted in and secured against rotation with respect to the thrust ring, off-set from one another in an axial direction and surrounding the two drive shafts and a respective shaft thrust ring for each drive shaft secured thereon against relative rotation. The two shaft thrust rings are off-set from one another in an axial direction with each shaft thrust ring bearing against a respective one of the butting rings.

The surfaces of each thrust ring and associated butting ring facing towards one another are preferably of tapered construction to facilitate lubrication.

2 Claims, 1 Drawing Figure

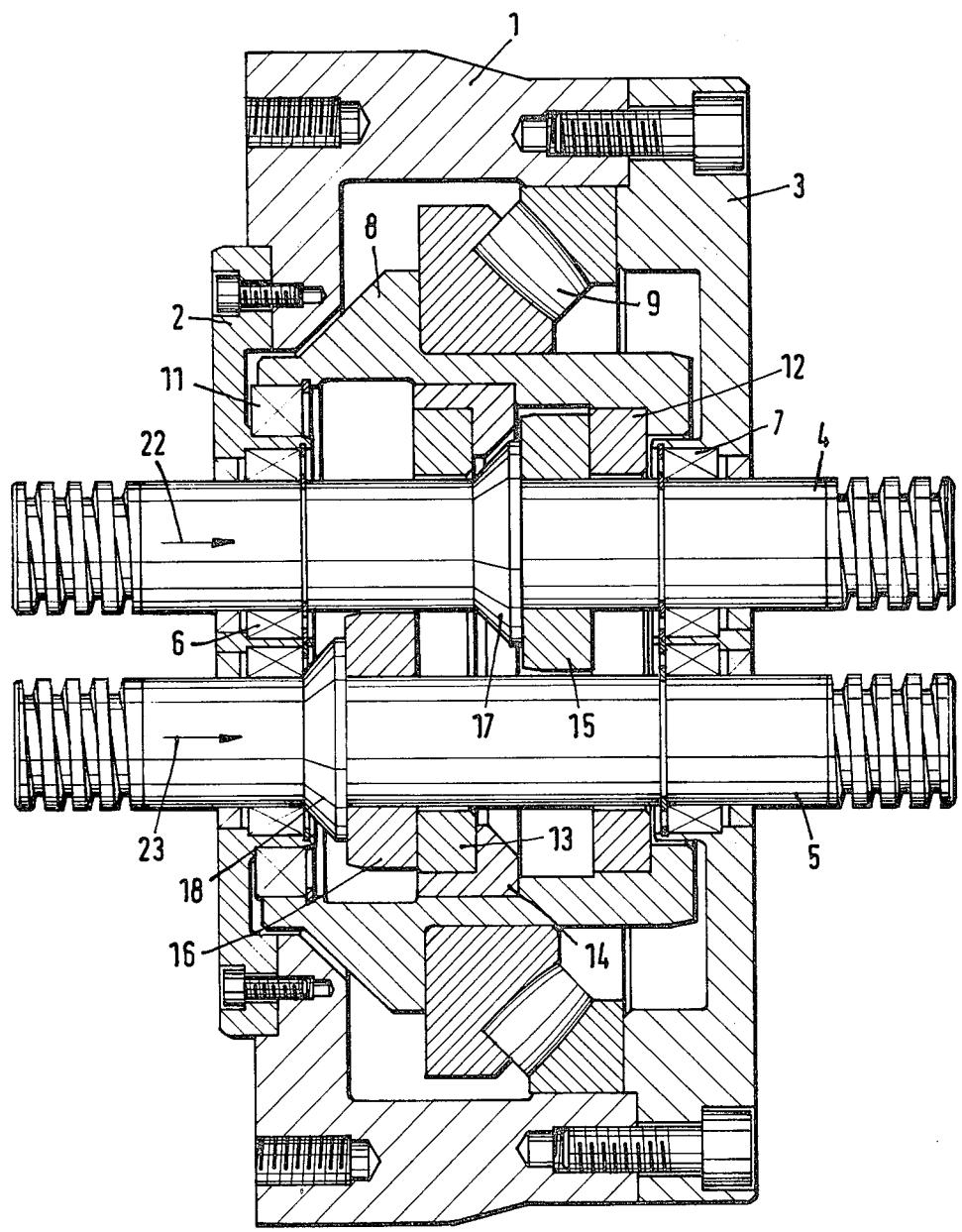

DRIVE MEANS FOR A TWIN SCREW EXTRUDER

The invention relates to drive means for a twin screw extruder and particularly to bearing means thereof.

The drive means of the invention are particularly though not exclusively applicable to a twin screw extruder for processing plastics moulding material.

In single screw extruders it is known for the axial back pressure force from the screw to be taken up by a thrust bearing disposed between the extruder and drive gearing. This arrangement keeps the drive gearing free from back pressure forces from the screw.

In twin screw extruders the arrangement of the thrust bearing poses a serious problem because of the small spacing between the screw shafts. It is not possible to arrange the thrust bearings in the same way as in single screw extruders ("Kunststoff-Extrudertechnik" by Gerhard Schenkel, Carl Hanser Verlag, 1963, page 220), because the largest possible shaft diameters through the thrust bearings do not allow the high torques required to be transmitted to the screw shanks. However, since a high torque must be transmitted to the screws it is customary to dispose axial thrust bearings behind the gearing in twin screw extruders. One then has to accept the disadvantage that the back pressure forces from the screws have to be transmitted to the thrust bearings through the gearing. Here they lead to undesirable strains, which have to be allowed for in the construction of the gearing. In the past the drive shafts have had to be axially displaceable within the gearing, so as to allow them to be elastically deformed by the axial strain.

The invention has among its objects to provide drive means including a thrust bearing for a twin screw extruder, which will allow high torques to be transmitted without the gearing being adversely affected by the axial back pressure forces from the screw.

According to the invention, there is provided drive means for a twin screw extruder, comprising a pair of drive shafts mounted in a housing and each to be connected to a drive and to a respective one of the screws of the extruder and bearing means, the bearing means comprising a thrust ring surrounding both drive shafts and supported in the housing by an axial roller bearing, a pair of coaxial butting rings inserted in and secured against rotation with respect to the thrust ring, off-set from one another in an axial direction and surrounding the two drive shafts, and a respective shaft thrust ring for each drive shaft secured thereon against relative rotation, the two shaft thrust rings being off-set from one another in an axial direction with each shaft thrust ring bearing against a respective one of the butting rings.

Such a construction of drive means can enable the axial thrust bearing for the two screws to be disposed in front of the gearing, that is to say, between the extruder and the gearing. In this way the gearing can be kept free from the axial back pressure forces of the screws even in a twin screw extruder. It is nevertheless still possible to transmit a high torque through the drive shafts. The diameter of the shafts need not be reduced because of the thrust bearing.

The drive shafts need no longer be constructed for axial displacement within the gearing.

The construction of the drive means according to the invention can simplify the construction of the gear box. For example, the tie rods which previously had to be provided in the gear box to relieve it can be dispensed with. These rods carried the back pressure forces of the screws back from the thrust bearing to the screw housing.

Advantageously the surfaces of each shaft thrust ring and associated butting ring facing towards one another are of tapered construction. In such a thrust bearing lubricant can be supplied better to the surfaces of the thrust ring and butting ring moving over one another.

The invention is diagrammatically illustrated by way of example in the accompanying drawing which is a sectional view through a drive housing of drive means for a twin screw extruder according to the invention.

Referring to the drawing, two drive shafts 4 and 5 of a twin screw extruder (not shown) are mounted in radial bearings 6 and 7 in a drive housing comprising a housing body 1 and two housing covers 2 and 3 which are screwed onto the housing body 1. A thrust ring 8, to take up the back pressure forces from the screws coupled to the two drive shafts 4 and 5, is supported by a self-aligning roller bearing 9. The front end of the thrust ring 8 is guided by a radial bearing 11 mounted on the housing cover 2. A butting ring 12 is inserted in the rear end of the thrust ring 8 and secured against rotation with respect to the thrust ring 8. A second butting ring 13, off-set in an axial direction, is similarly inserted in and secured to the thrust ring 8 by means of an intermediate ring 14 fixed in the thrust ring 8. The two butting rings 12 and 13 are arranged coaxially in the thrust ring 8 and also surround the two drive shafts 4 and 5.

The lefthand side of the bearing housing 1 is screwed to an extruder housing (not shown) and the drive shafts 4 and 5 are aligned with and non-rotatably connected to screw shanks.

A gear box (not shown) is mounted at the righthand side of the bearing housing, and its secondary drive shafts are aligned with and non-rotatably connected to the drive shafts 4 and 5.

Inside the bearing housing the drive shafts 4 and 5 each have a shoulder 17 and 18 respectively, with the shoulders 17, 18 off-set from one another in an axial direction, to form contact surfaces for shaft thrust rings 15 and 16 respectively. Each shaft thrust ring 15 and 16 is secured against rotation with respect to the respective shaft 4 and 5. Each shaft thrust ring 15, 16 bears against a respective one of the butting rings 12 and 13 and has a slightly tapered surface at its supporting side. The butting rings 12 and 13 similarly have a matching, slightly tapered construction.

Back pressure forces, indicated by the arrows 22 and 23, from the screws, are transmitted by the shaft thrust rings 15 and 16 to the butting rings 12 and 13 respectively and thus to the thrust ring 8. The rotation of the two screws leads to a sliding-over movement between the shaft thrust ring 15 or 16 and the butting ring 12 or 13 respectively. The rotating shaft thrust ring 15, 16 of smaller diameter gives rise to a rolling-sliding motion over the co-rotating butting ring 12, 13 of larger diameter.

What is claimed is:

1. In drive means for a twin screw extruder, comprising a pair of drive shafts mounted in a housing and each to be connected to a drive and to a respective one of the screws of the extruder, bearing means comprising a thrust ring surrounding both of said drive shafts; an axial roller bearing supporting said thrust ring in said housing; a pair of coaxial butting rings inserted in and secured against rotation with respect to said thrust ring, said coaxial butting rings being off-set from one another in an axial direction and surrounding said two drive shafts; and a respective shaft thrust ring for each said drive shaft secured thereon against relative rotation, said two shaft thrust rings being off-set from one another in an axial direction with each said shaft thrust ring bearing against a respective one of said butting rings.

2. The invention of claim 1, wherein surfaces of each said shaft thrust ring and associated said butting ring facing towards one another are of tapered construction.

* * * * *